March 22, 1932.  A. O. JAEGER  1,850,398
CATALYTIC APPARATUS
Filed Dec. 5, 1927   5 Sheets-Sheet 1

Inventor
Alphons O. Jaeger
By Robert Ames Norton
Attorney

March 22, 1932.  A. O. JAEGER  1,850,398
CATALYTIC APPARATUS
Filed Dec. 5, 1927  5 Sheets-Sheet 2

Inventor
Alphons O. Jaeger
By Robert Ames Norton
Attorney

March 22, 1932.   A. O. JAEGER   1,850,398
CATALYTIC APPARATUS
Filed Dec. 5, 1927   5 Sheets-Sheet 3

Alphons O Jaeger
INVENTOR.
BY Robert Ames Norton
ATTORNEY

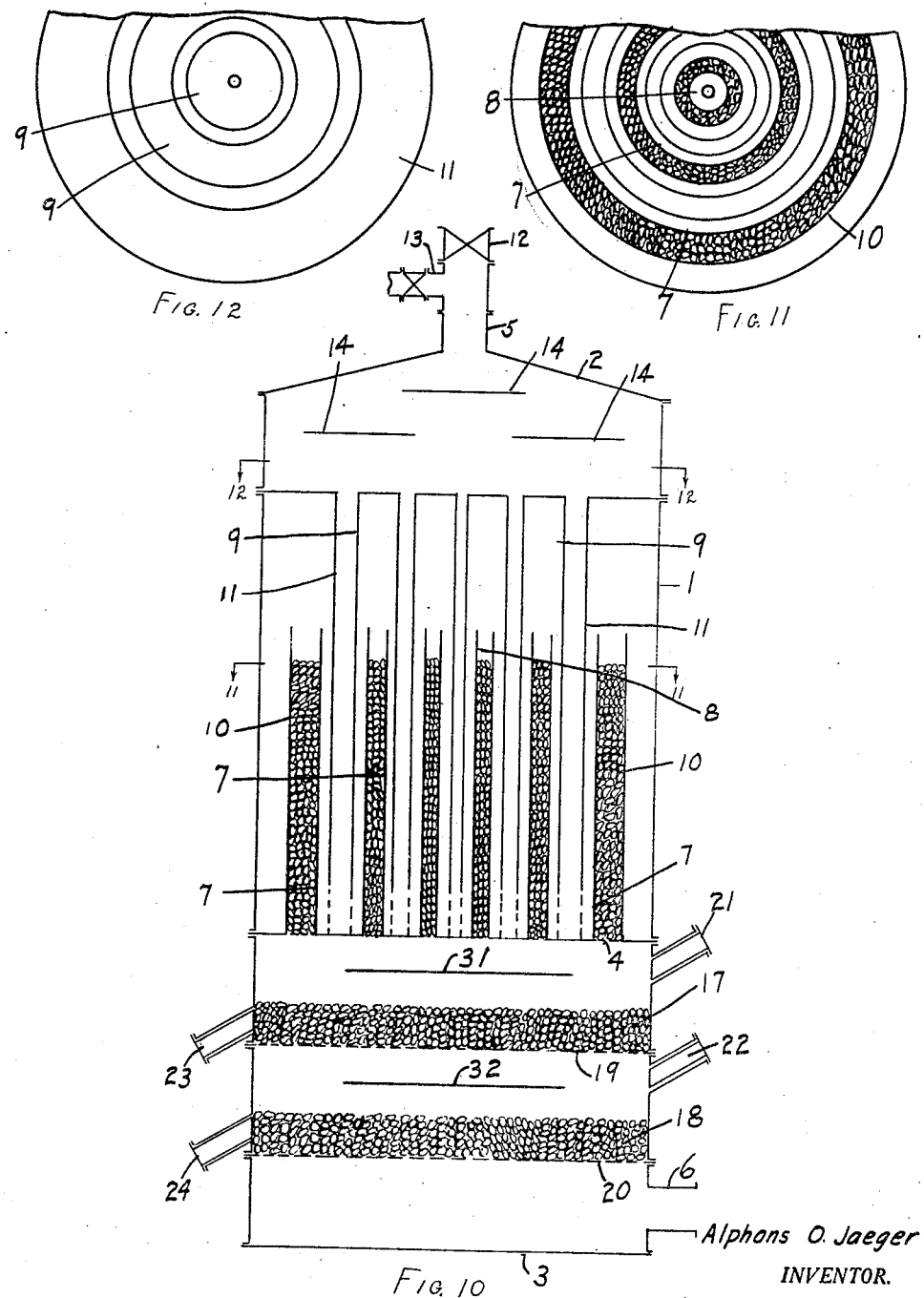

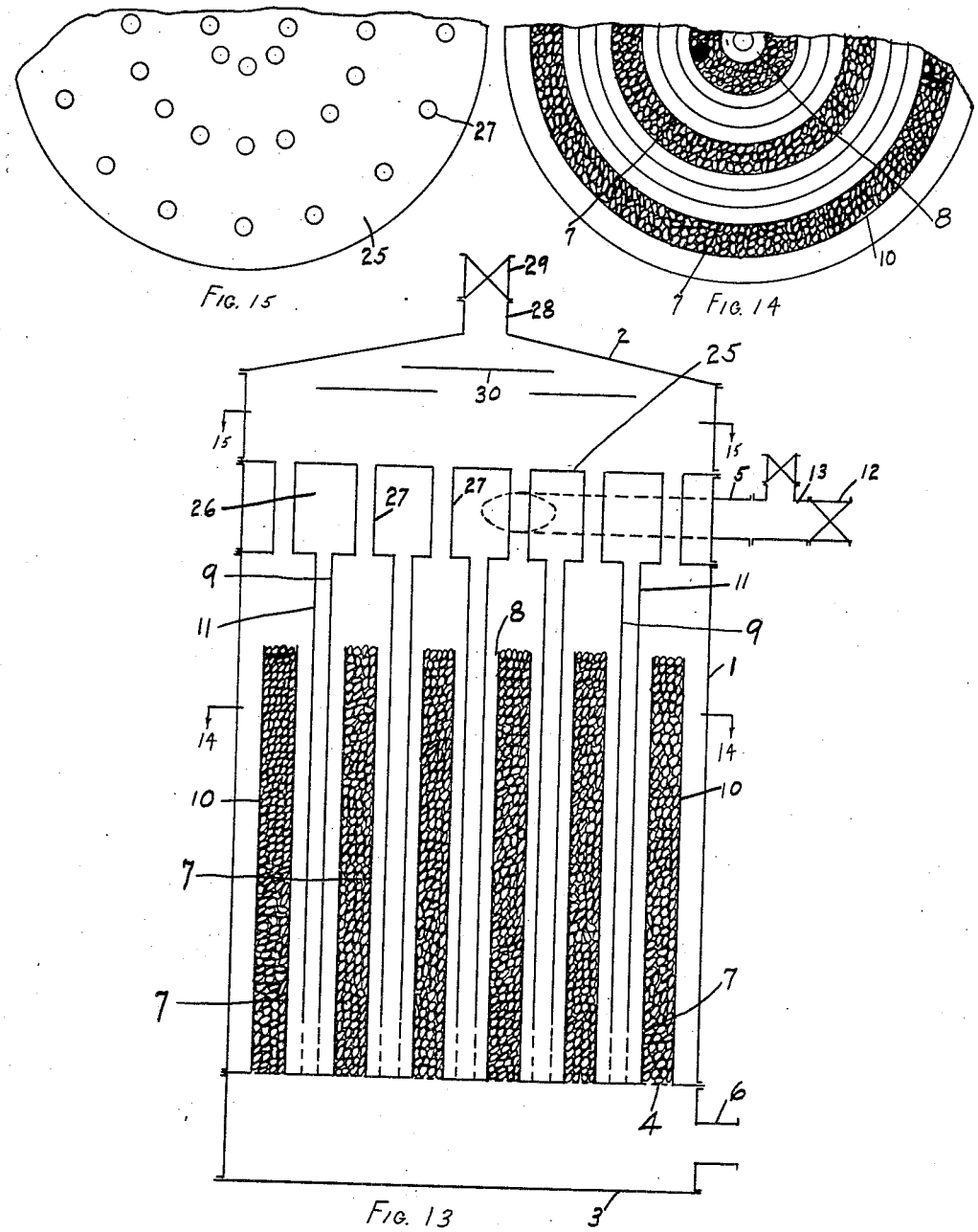

Patented Mar. 22, 1932

1,850,398

UNITED STATES PATENT OFFICE

ALPHONS O. JAEGER, OF CRAFTON, PENNSYLVANIA, ASSIGNOR TO THE SELDEN COMPANY, OF PITTSBURGH, PENNSYLVANIA, A CORPORATION OF DELAWARE

CATALYTIC APPARATUS

Application filed December 5, 1927. Serial No. 237,613.

This invention relates to catalytic apparatus and more particularly to converters for vapor phase catalytic reactions especially those requiring accurate temperature control.

Many vapor phase catalytic reactions require a powerful temperature control because of the large amount of heat evolved in some of the reactions and because it is necessary to provide an accurate temperature control in order to maintain reaction conditions for optimum production. The necessity for control is particularly needed in oxidation reactions such as the oxidation of sulfur dioxide to sulfur trioxide and many organic compounds to intermediate products. Examples of these reactions are anthracene-containing materials to anthraquinone, toluol or derivatives of toluol to corresponding benzaldehydes and benzoic acids, benzol to maleic acid, acenaphthene to acenaphthaquinone, bisacenaphthylidenedione, naphthaldehydic acid, naphthalic anhydride, and hemimellitic acid, fluorene to fluorenone, eugenol and isoeugenol to vanillin and vanillic acid, methyl alcohol and methane to formaldehyde, ethyl alcohol to acetic acid, ethylene chlorhydrine to chloracetic acid and the like. Organic oxidations in which impurities are selectively burned out or transformed into easily removable substances also require accurate control. Examples of such reactions are the purification of crude anthracene of phenanthrene by the selective catalytic combustion of carbazol, the purification of crude naphthalene, crude mononuclear aromatic hydrocarbons and crude aliphatic compounds such as high sulfur oils and motor fuels. Ammonia from coal tar may also be purified by selective oxidation of organic impurities and requires a good temperature control.

In addition to the strongly exothermic oxidation reactions referred to above, the apparatus of the present invention may be used with excellent effect for other reactions, some of which are not so strongly exothermic. Thus for example, ammonia can be oxidized to nitrogen oxides, preferably with the omission of uncooled catalyst layers. The catalysts may be uniform or may vary in their strength in the direction of gas flow.

Catalytic reductions with or without the use of pressure are also readily carried out in the converters of this invention. Thus, for example, nitro compounds may be catalytically reduced to the corresponding amines or other intermediate reduction products. Nitrobenzene, nitrotoluol, nitrophenol, nitronaphthalene, and the like are compounds which can be effectively reduced in converters of the present invention. Hydrogenation reactions are also readily carried out in converters of the present invention, for example the hydrogenation of benzol to cyclohexane, phenol to cyclohexanol, naphthalene to tetraline and decaline, crotonaldehyde to normal butyl alcohol, acetaldehyde to ethyl alcohol and the like.

Various synthetic reactions, such as for example the reduction of oxides of carbon to methanol, higher alcohols and ketones or synthetic motor fuel mixtures are well adapted for the converters of the present invention. The processes may be carried out with or without pressure. Other synthetic reactions such as the synthesis of ammonia, hydrocyanic acid and the like, may also be carried out in automatic gas cooled converters according to the present invention.

Other catalytic reactions are of importance, such as the catalytic water gas process, catalytic dehydrogenations, dehydrations, condensations and polymerizations. The catalytic splitting off of carbon dioxide from polycarboxylic acids is another reaction for which converters of the present invention are well adapted. Thus, for example, phthalic anhydride may be catalytically split to benzoic acid in converters described above. Composite reactions such as the splitting off of carboxylic groups from phthalic anhydride in a reducing atmosphere to produce benzaldehyde, benzyl alcohol, and the like, the catalytic splitting of the carboxylic group of phthalid to produce benzyl alcohol and other composite reactions may effectively be carried out in converters of the present invention, it being noted that endothermic as well as exothermic reactions are practicable.

Cracking reactions and destructive hydrogenations such as, for example, destructive hydrogenations of crude phenanthrene, are examples of a further type for which the apparatus of the present invention is well adapted. In general almost any vapor phase catalytic reaction can be carried out by means of apparatus employing the principles of the present invention.

In the past, two general types of converters have been used, those cooled by reaction gases and those employing a bath, boiling or non-boiling, in heat exchanging relation to the catalyst. The present invention relates to gas cooled converters. Gas cooled converters used in the prior art have been of two general types, tubular converters in which the catalyst is placed in a number of tubes surrounded by the gaseous cooling medium and converters in which layers of catalyst are used, as for example the well known Grillo type of contact sulfuric acid converter. Tubular converters give powerful cooling especially when properly constructed, particularly where tubes of relatively small diameter are used. These converters, however, are expensive to build and maintain and require a very large number of gas tight joints. Tubular converters are also open to the further disadvantage that it is difficult to adjust the catalyst resistance to gas flow perfectly uniformly in all of the tubes and frequently necessitates long and expensive hand filling of the converters. The cooling also is not fully automatic and fluctuations in reaction speed are apt to upset the temperature control. Nevertheless, hitherto tubular converters have been considered the best for use in delicate or highly exothermic reactions or where high loadings are desired.

Layer type converters are cheap to build, present no difficulty in catalyst filling, and permit a very uniform gas flow throughout the whole of the catalyst layer. They are, however, practically useless when highly exothermic reactions or high loadings are in question or very delicate temperature control is necessary. The catalyst layers are cooled practically only by the converter wall and by the reaction gases passing through them and as most catalysts are poor conductors of heat the temperature throughout the catalyst layer is very uneven.

The present invention combines the simplicity and cheapness of the layer type converters with a cooling capacity equal to the best tubular converters and the important advantages that the cooling capacity increases in direct proportion to the reaction gas flow which in turn, of course, determines the heat evolved.

In endothermic reactions, of course, the same necessity for greater control is present and the advantages of the present invention are equally applicable to endothermic as well as exothermic reactions.

According to the present invention a catalyst layer is used in which double counter current heat exchangers are embedded. These heat exchangers permit the reaction gases to flow first in indirect heat exchanging relation with the contact mass, then reverse their flow and pass in direct heat exchanging relation with the contact mass, and then after a second reversal of flow pass through the contact mass. The heat exchange elements of the present invention consist in nested annuli, each annulus having one end open and in one modification one set of annuli fitting into the other set. The catalyst is placed in the annular spaces defined between one set of annuli and the reaction gases enter into one set of annuli, for example through the annular spaces defined by the other set of annuli. The invention will be clear from the more detailed description which follows taken in conjunction with the drawings in which Fig. 1 is a vertical cross section through a converter showing a simple type of converter embodying the principles of the present invention;

Fig. 10 is a vertical section through a converter of the type shown in Figs. 4 to 6 provided with additional uncooled catalyst layers;

Figs. 11 and 12 are horizontal cross sections along the lines of 11—11 and 12—12 of Fig. 10;

Fig. 13 is a vertical section of the type shown in Figs. 7 to 9 but provided with auxiliary means for introducing part of the reaction gases directly into the catalyst;

Figs. 14 and 15 are horizontal cross sections along the lines of 14—14 and 15—15 of Fig. 13.

Figure 1:
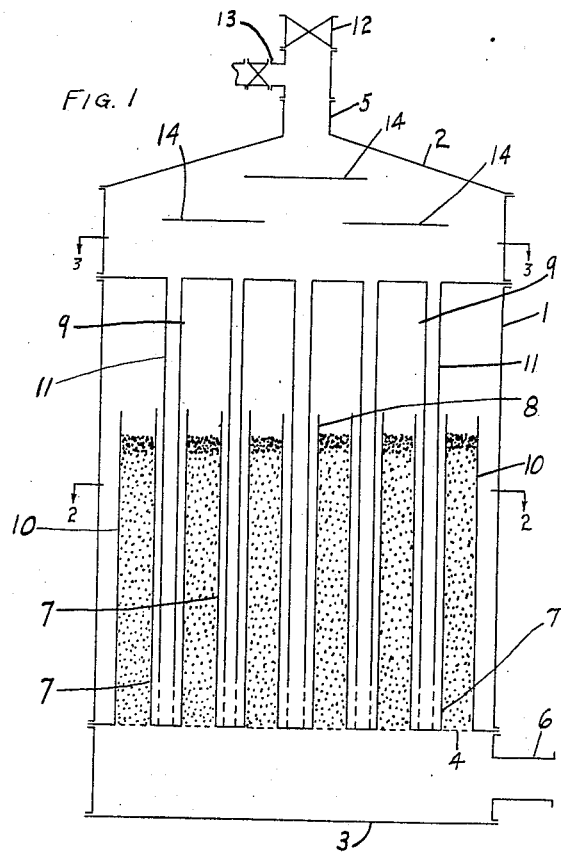

The converter shown in Fig. 1 consists in a shell 1, top piece 2, bottom piece 3, catalyst supporting screen 4, reaction gas inlet 5, and outlet 6. In the converter are nested concentric annuli 7, having their closed ends resting on the screen 4 and open at their upper end. What would correspond to the central annulus is, of course, a closed-end tube 8. Concentric annuli 9 are nested into the annuli 7 and closed end tube 8 with their perforated open ends extending into the annuli 8. The outside annulus of each system consists in open cylindrical L-shaped plates 10 and 11 which with the converter wall 1 define the outer annuli. The gas inlet pipe 5 is preferably provided with a valve 12 and with a valved auxiliary pipe 13 through which additional reaction gas may be led in. Baffle plates 14 are also provided in the upper space of the converter. The catalyst is placed in the annular spaces between the annuli 7 including the central tube 8 and the L-shaped plate 10.

In operation, the incoming reaction gases are thoroughly mixed and distributed by the baffles 14 and pass downwardly through the annular spaces defined between the annuli 9 including the L-shaped plate 11. In this flow they are in indirect heat exchanging relation with the catalyst as a moving gas is interposed between the walls defining the annular spaces and the catalyst retaining walls. In reaching the bottom of the annular space the reaction gases pass out through the perforations, reverse their flow and pass up in the annular spaces defined between the annuli 9 including the L-shaped plate 12 and the annuli 7 including central tube 8. During this reverse flow gases are in direct heat exchanging relation with the catalyst through the catalyst retaining walls. On reaching the top of the annuli 7 and central tube 8 the gases again reverse their flow and pass downwardly through the catalyst and then out through pipe 6. It will be apparent that the temperature controlling effect of the reaction gases is exactly proportional to the speed of their flow and as the speed of flow also defines the amount of heat generated in the catalyst in the case of an exothermic reaction or heat absorbed in the case of an endothermic reaction the temperature will remain constant without regard to speed of reaction gases within wide limits. By a suitable dimensioning of the annuli the spaces traversed by the reaction gases on their downward flow and particularly on their upward flow can be made as small as desired in order to maintain a high reaction gas velocity in order to assure highly effective heat transfer. In the same way the dimensions and spacing of the annuli 7 will determine the thickness of the catalyst annuli and an optimum thickness of catalyst for any particular reaction or any catalyst of particular heat conductivity can be obtained. In general highly exothermic reactions or reactions where very accurate temperature control is necessary are preferably carried out in converters having relatively narrow gas passages and thin catalyst annuli in order to provide for most effective heat transfer.

Figure 3:
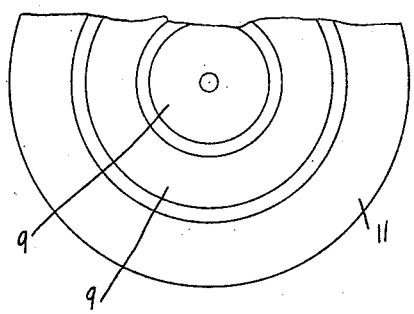
Figs. 2 and 3 are horizontal sections along the lines of 2—2 and 3—3 of Fig. 1.
Figure 2:
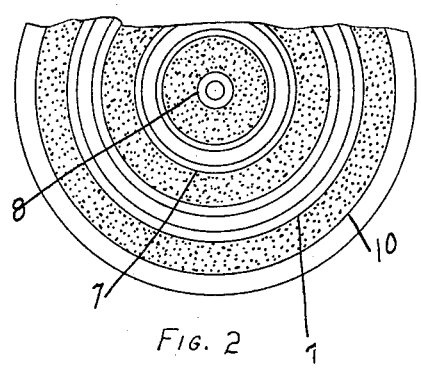
Figure 6:
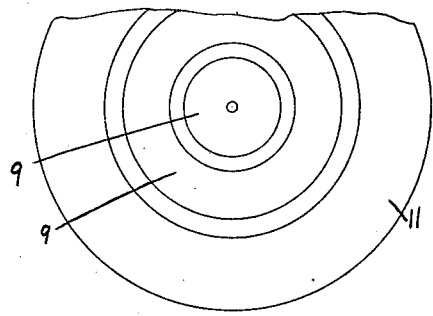
Figs. 5 and 6 are horizontal sections along the lines of 5—5 and 6—6 of Fig. 4.
Figure 5:
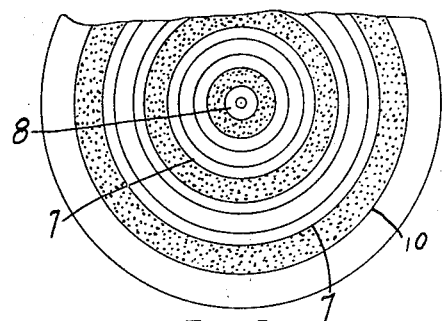
Figure 4:
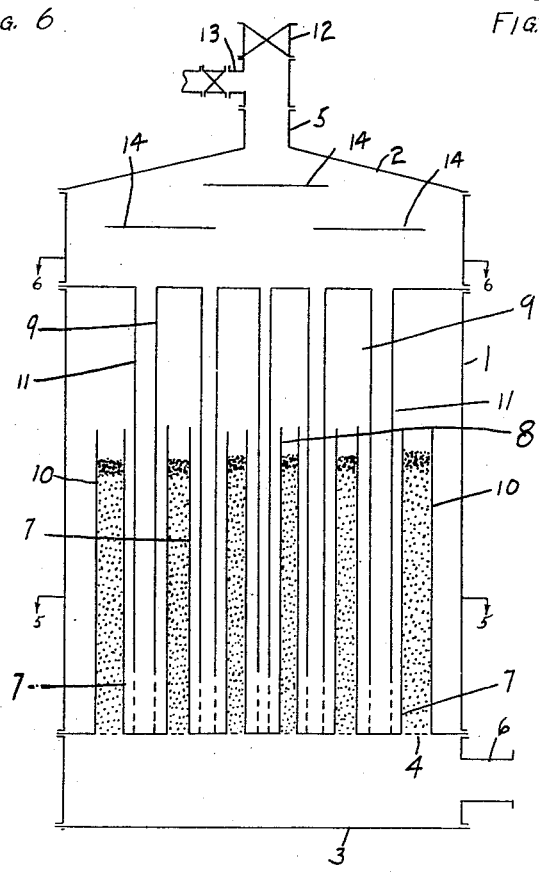
Fig. 4 is a vertical section through a converter of the type shown in Fig. 1 but provided with catalyst annuli of decreasing thickness from the periphery toward the center of the converter in order to provide more powerful cooling of the central portion.

While the cooling is substantially completely automatic and does not vary with variations in reaction gas speed, it should be noted that this applies only to the cooling effected by the reaction gases themselves. Cooling which is effected by radiation or conduction from the converter shell does not vary with the gas velocity. In order to compensate for this additional cooling which, of course, is most effective in peripheral catalyst zones it is desirable in some cases to vary the thickness of the catalyst annuli, decreasing the thickness from the periphery toward the center of the converter so that the cooling efficiency and heat evolved is varied to compensate for converter shell cooling. This type of converter is shown in Figs. 4 to 6 which are identical in design with Figs. 1 to 3 but illustrate catalyst annuli of progressively decreasing thickness of cross section from the periphery toward the center. It should be understood, of course, that converters in the drawings are shown purely diagrammatically and in practice it is usually desirable to insulate the converter shell which will result in a decrease in the factor of converter shell cooling. However, it is not practicable to provide complete insulation and for certain delicate or highly exothermic reactions it is therefore desirable to utilize a progressively varying catalyst thickness as shown in Figs. 4 to 6.

Figures 8, 9:
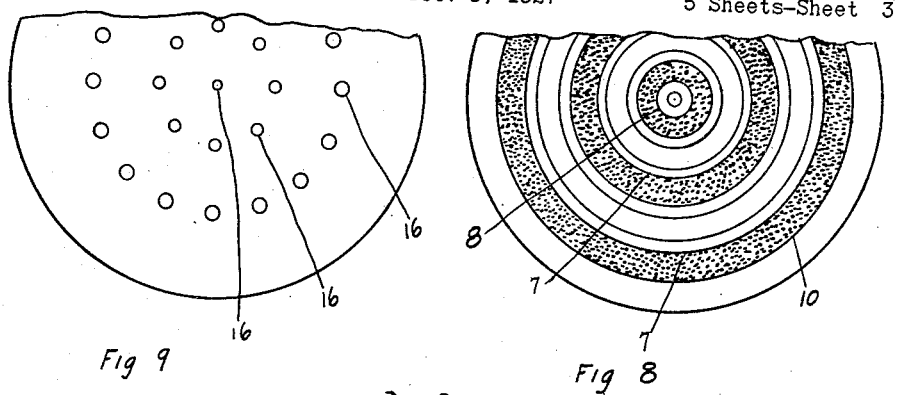
Figs. 8 and 9 are horizontal sections along the lines of 8—8 and 9—9 of Fig. 7.
Figure 7:
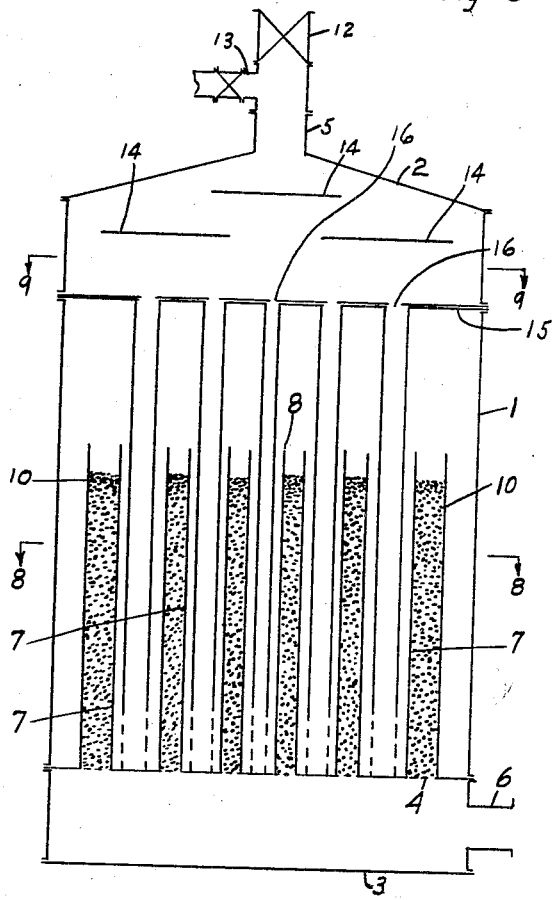
Fig. 7 is a vertical section through a converter of the type shown in the foregoing figures but provided with an orifice plate to vary the amount of gases flowing into the upper annuli.

Figs. 7 and 8 illustrate a converter of the general design shown in Figs. 4 to 6 but provided with a perforated plate 15 placed above the upper annuli and provided with concentric circles of orifices 16 illustrating that the annular spaces defined between the upper annuli, by a suitable adjustment of the size and number of perforations the proportion of gases flowing through the different annular spaces can be varied and by this means the amount of cooling can also be varied to compensate for the cooling effect of the converter shell. Figs. 7 and 8 also show a variation in thickness of catalyst annuli as shown in Figs. 4 to 6 but can, of course, where desirable be designed with catalyst annuli of constant thickness as in Figs. 1 to 3.

Figs. 10 to 12 illustrate a converter of the design shown in Figs. 4 to 6 but is provided with two uncooled catalyst layers 17 and 18 supported by screens 19 and 20 and provided with filling tubes 21 and 22 and emptying tubes 23 and 24. Baffle plates 31 and 32 are also interposed between the annular catalyst layers and the first uncooled layer and between the latter and the second uncooled layer. The operation of the converter is the same as that shown in Figs. 5 and 6 but may be used where it is desirable to run the automatic gas cooled layers at loadings in excess of those permitting high percentage yields, the partly reacted gases then being caused to contact with uncooled layers to effect the last few percent of conversion which, of course, does not generate much heat in the case of exothermic reaction or does not require much heat in the case of endothermic reaction. The baffle plates 31 and 32 provided enhance mixing of the partly reacted gases and also tend to throw them out toward the converter shell where they are subjected to cooling or heating thereby.

The arrangement shown in Figs. 10 to 12 is also very suitable for composite reactions which take place in two stages, particularly where the first stage is strongly exothermic or requires a particularly delicate control. The catalysts in the different layers may be different and even in the case of a single reaction it is frequently desirable to vary the nature of the catalyst in the different layers, thus, for example, the later layers may advantageously be provided with progressively stronger catalysts. The catalyst in the automatically gas cooled catalyst layers may also vary in strength in the direction of the gas flow and this feature may, of course, also be applied to the converters shown in the other figures.

Figs. 13 to 15 illustrate a converter of the general type shown in Fig. 1 but provided with means for introducing some reaction gas directly into the catalyst without passing into the counter current heat exchangers. For this purpose the converter is provided with a perforated plate 25 placed above the annuli 9 and forming therewith a chamber or space 26 into which the reaction gas pipe 5 leads. The perforated plate 15 is connected to the tops of the annuli 9 and the L-plate 11 by means of short tubes 27. An auxiliary gas introducing pipe 28 controlled by a valve 29 is mounted into the top piece 2 of the converter and baffles 30 are placed between the top piece 2 and the perforated plate 25.

In operation the reaction gases passing in through the pipe 5 flow down through the double counter heat exchangers precisely as in the foregoing figures. Additional reaction gas coming in through the pipe 28 flows through the pipes 27 directly to the catalyst without passing to the heat exchangers. This auxiliary gas may be used to adjust the temperature of the gases passing into the catalyst or it may be used in an emergency to control excessive reaction violence. Obviously, of course, the other features shown in the foregoing figures, such as variation of the catalyst thickness, provision of uncooled catalyst layers, and the use of tubes in place of one set of annuli, as shown in Figs. 7 to 9, may be combined with auxiliary gas introduction shown in Figs. 13 to 15. Other modifications within the scope of the invention will readily occur to a skilled engineer and are included in the invention. The drawings are purely diagrammatic and, of course, all necessary accessories and proper structural features will be chosen by the engineer.

In the claims, the expression "direct heat exchanging relation" is used to define a heat exchanging relation in which there is a direct flow of heat, such as that through a solid wall, as opposed to the expression "indirect heat exchanging relation" which covers a relation in which the heat is transmitted through a moving medium.

In the specification and claims it is understood that the term "concentric annuli with open tops" is intended to refer to concentric annuli which are open at one end and closed at the other, and all of which are open at the same end. In actual practice, of course, it makes little difference which end is considered as the "top" as the converter may be readily reversed in the manner shown in Fig. 6 of my copending application Serial No. 327,853, filed December 22, 1928.

The structural details of the annular double countercurrent heat exchange converter are shown in Figs. 7 and 8 of my prior Patent No. 1,660,511, dated February 28, 1928.

What is claimed as new is:

1. A converter comprising a catalyst chamber, a set of concentric annuli which are open at one end and closed at the other arranged therein with the open ends in the same direction, the central annulus being a tube, catalyst in the spaces defined between said annuli, and means for causing reaction gases to pass from the open to the closed ends of the annuli, then to reverse their flow within the annuli and pass from the closed to the open ends thereof in direct heat exchanging relation with the catalyst and with the incoming gases.

2. A converter comprising a catalyst chamber, a set of concentric annuli which are open at one end and closed at the other arranged therein with the open ends in the same direction, the central annulus being a tube, catalyst in the spaces defined between said annuli, and means for causing reaction gases to pass from the open to the closed ends of the annuli, then to reverse their flow within the annuli and pass from the closed to the open ends thereof in direct heat exchanging relation with the catalyst and with the incoming gases, said means comprising similar concentric annuli having one end closed and the other open, with their open ends nesting into the first mentioned annuli and central tubes, the closed tops of said nesting annuli defining with the converter shell a chamber, and means for introducing reaction gases into said chamber.

3. An apparatus according to claim 1 in which the thickness of the catalyst annuli decreases from the periphery of the converter toward the center.

4. A converter according to claim 2 in which the thickness of the catalyst annuli decreases from the periphery of the converter toward the center.

5. A converter according to claim 1 in which uncooled catalyst layers are provided below the catalyst annuli.

6. A converter according to claim 1 in which means are provided for directly introducing a portion of the reaction gases into the catalyst without passing through the double counter current heat exchange elements defined by the annuli.

7. A converter according to claim 1 in which means are provided to vary the proportionate amount of gases flowing through the different annular double counter current heat exchange elements.

Signed at Pittsburgh, Pa., this 2nd day of December, 1927.

ALPHONS O. JAEGER.